United States Patent
Tylaska et al.

(10) Patent No.: US 9,366,315 B2
(45) Date of Patent: Jun. 14, 2016

(54) LOCKING QUICK CONNECT FITTING

(71) Applicants: Timothy T. Tylaska, Preston, CT (US); Thomas W. Dixon, New London, CT (US)

(72) Inventors: Timothy T. Tylaska, Preston, CT (US); Thomas W. Dixon, New London, CT (US)

(*) Notice: Subject to any disclaimer, the term of this patent is extended or adjusted under 35 U.S.C. 154(b) by 85 days.

(21) Appl. No.: 14/540,061

(22) Filed: Nov. 13, 2014

(65) Prior Publication Data
US 2015/0132044 A1  May 14, 2015

Related U.S. Application Data

(60) Provisional application No. 61/903,654, filed on Nov. 13, 2013.

(51) Int. Cl.
*F16G 11/10* (2006.01)
*B63B 15/02* (2006.01)

(52) U.S. Cl.
CPC ............... *F16G 11/10* (2013.01); *B63B 15/02* (2013.01); *Y10T 403/295* (2015.01)

(58) Field of Classification Search
CPC ............ F16B 7/042; F16B 7/105; F16B 7/20; F16B 21/04; Y10T 403/7005; Y10T 403/7007
USPC ................................................. 403/348, 349
See application file for complete search history.

(56) References Cited

U.S. PATENT DOCUMENTS

| | | | |
|---|---|---|---|
| 2,060,523 A | 11/1936 | Packer | |
| 2,267,802 A | 12/1941 | Purdy | |
| 2,299,357 A | 10/1942 | Strunk et al. | |
| 2,362,856 A | 11/1944 | Strunk et al. | |
| 2,444,758 A | 7/1948 | Stillbach | |
| 2,448,548 A | 9/1948 | Purdy | |
| 3,065,009 A | 11/1962 | Austin | |
| 3,866,559 A | 2/1975 | Joensen | |
| 4,448,476 A | 5/1984 | Perlman | |
| 4,645,373 A | 2/1987 | Purdy | |
| 4,981,448 A | 1/1991 | Herbert | |
| 5,582,489 A | 12/1996 | Marzio | |
| 7,104,826 B2 | 9/2006 | Zahlit | |
| 7,455,542 B2 | 11/2008 | Norwood | |
| 8,262,311 B2 | 9/2012 | Trice | |

*Primary Examiner* — Daniel Wiley
(74) *Attorney, Agent, or Firm* — William B. Ritchie (57) ABSTRACT

A locking quick connect fitting allows for the attachment and detachment of stays and rigging on sailboats and other related applications. The invention eliminates the need to handle clevis pins and cotter pins when setting up or tearing down the rigging of a sailboat, and especially for the standing rigging of a trailer able sailboat. Further, it can be tightened by wrench. In addition, the fitting helps keep the connection secure even if in the unlocked state. The presented invention is also modular and readily connectable to the rigging or fittings on existing sailboats.
In order to avoid abandonment of the application, applicant must make these above agreed upon changes.

9 Claims, 12 Drawing Sheets

LOCKING QUICK CONNECT FITTING

This application claims benefit of U.S. Provisional Application Ser. No. 61/903,654, filed Nov. 13, 2013, pursuant to 35 USC §119(e).

FIELD OF THE INVENTION

The invention relates to rigging-type fittings, in particular, a lockable quick connection fitting for attaching and detaching lines or cables such as the standing rigging used on sailboats.

BACKGROUND OF THE INVENTION

In the field of sailing, and especially in the field of trailerable sailboating, it is necessary to raise the mast and attach the corresponding standing rigging to the deck when preparing to launch the boat. The rigging must then be removed and the mast taken down again when the boat is to be put back on the trailer at the end of the day. The current state of the art procedure for the attachment or detachment of the standing rigging is for a person to pull the rigging cables taut by hand, hold the mast in place, and then insert or remove a clevis pin through an eye fitting on both the end of the rigging cable and on the boat deck. A cotter pin or spring ring is then used to keep this pin captive. The current set up or tear down operation of the rig usually takes one or more additional persons to accomplish. The operation must be done quickly as the mast is prone to falling over and causing injury. It is therefore desirable to create a quick connection fitting to eliminate the tricky operation of having to insert or remove a pin to attach or detach the rigging. Such quick release connection is also useful for attaching or detaching baby stays from the mast of certain classes of sailboats. The connection must also be securely lockable and resistant to accidental loosening due to the rubbing action of sailboat lines or sheets sliding over the connection joint. In addition, the connection should also be somewhat secure even in the unlocked state to safeguard from any shocks or vibration that may occur during the set up before the operator has had a chance to securely lock the device. The overall device must possess a clean exterior profile that will not snag on lines that pass by such as occurs when tacking or jibing the boat. Furthermore, the connection must be designed to function with the possibility of salt and sand build up in the maritime environment. Finally, to keep the costs reasonable for the pleasure sailing market, the device must be configured in such a geometry to allow for efficient production on an automatic production lathe.

DESCRIPTION OF PRIOR ART

The Purdy patent, U.S. Pat. No. 4,645,373 describes a quick release connector for connecting the lines on the masts and stays of boats. This invention uses a T-shaped plug and corresponding T-shaped receiving receptacle to create the connection. While a valid option for a connection, the invention has several drawbacks. One drawback is its lack of a secure enough locking device to ensure the connector does not come undone in the rigors of the sailing environment. The Purdy invention depends on a single twistable exterior mounted sleeve to act as the lock to secure the T-shaped plug member into the T-shaped receptacle and to prevent the connection from coming loose. In the field of sailing, such a single exterior mounted sleeve is prone to being rubbed on by the jib or spinnaker sheets sliding past. This frictional force could accidentally rotate the sleeve, causing the connection to pop open and result in catastrophic collapse of the mast. The use of the twistable sleeve in the Purdy U.S. Pat. No. 4,645,373 also depends on the strength of the operator's grip for tightness and then on frictional forces from a cam action interaction to help with security. It does not utilize more secure methods such as a threaded component or additional jam nut that could be tightened with a wrench and not be so dependent on the operator's physical strength. The Purdy U.S. Pat. No. 4,645,373 invention also has the drawback of requiring a sharp cornered T-slot that is difficult to machine in mass production. A broach type tool is generally required to create the described sharp cornered slot. This broaching operation would have to take place in an axis perpendicular to the main turning axis that the part would normally be rotated if made in a standard lathe. Such an off-axis machining operation would most likely require a secondary set up and prevent the part from being made more economically in a single set up such as on a swiss-type sliding headstock production lathe.

The Joensen patent, U.S. Pat. No. 3,866,559 describes a sailboat stay release which consists of a toggle mechanism that utilizes a linkage. While addressing the same problem as the presented invention, patent, U.S. Pat. No. 3,866,559 utilizes a completely different mechanism for its operation and lacks the quick connect and disconnect feature of the presented apparatus. It also does not possess as clean of an outside exterior as the presented invention, making it more prone to snagging on lines.

The Austin patent, U.S. Pat. No. 3,065,009 describes a twist-lock rod coupling device originally designed for connecting and assembling extendable grain bin probe rods. The invention consists of two interconnecting shafts that uses a coupling sleeve to connect the lower and upper shaft components. While possibly suitable for the grain bin application, the U.S. Pat. No. 3,065,009 invention does not possess the requirements needed for a suitable sailboat rig connection. The invention again has the drawback of not being able to be locked securely from the twisting forces generated from sliding lines or sheets that may rub against it.

The coupling sleeve also has no way to be tightened other than relying upon the operator's physical strength to twist it and also depends upon friction to prevent accidental release. Finally, it lacks a spring or other tensioning device to safeguard against movement from any sudden shock or vibration during set up.

The Purdy patent, U.S. Pat. No. 2,448,548 relates to another attachable and separable coupling for rods and cables. The U.S. Pat. No. 2,448,548 invention strives to create a device that does not have any relative lengthwise displacement and was designed for transmitting both longitudinal and rotary power. While perhaps adequate for certain applications, the invention is not ideal for the use with sailboat rigging due to several drawbacks. Like the above forementioned inventions, it also has the drawback of utilizing a single exterior sleeve for its locking function which is prone to accidental release due to the rubbing forces created from passing jib or spinnaker sheets on sailboats. The invention offers no means of allowing the operator to tighten and secure the connection using a force multiplying tool such as a wrench and depends solely on the operator's physical grip strength to twist the locking sleeve in place. The invention also requires the use of two cross pins and two slots which adds to the manufacturing costs and creates additional cavities prone to caking with salt and sand when used in maritime environments.

The Purdy patent U.S. Pat. No. 2,267,802 describes a further coupling joint adaptable to sundry uses such as the joining of rods, cables and fixtures. It also possesses an exposed single exterior sleeve to gain its locking ability and possesses no ability to securely prevent the sleeve from coming loose other than from friction. For sailing rigging, such a single exteriorly mounted sleeve is prone to high twisting forces created from the accidental snagging and rubbing of passing lines and sheets and could come undone. The U.S. Pat. No. 2,267,802 invention also lacks the ability to allow the operator to tighten and secure the connection using a force multiplying tool such as a wrench. The invention further has the drawback of utilizing a spring-tensioned plunger attached to the main insertion member which then inserts into a blind hole. By having the main insertion member mounted to a spring instead being a continuous a rigid rod, any additional insertion resistance encountered by the plunger into the blind hole could merely slide the plunger backward against the tension of the spring and impede proper connection. The maximum insertion force in such an arrangement is limited by the compressive strength of the spring and not the operator's strength. Such an arrangement limits the user the ability to utilize their entire strength for inserting such member into the receiving hole. In the application of sailing, blind holes are prone to being caked with salt and sand which may create a substantial increase in the insertion force. The design of U.S. Pat. No. 2,267,802 thus makes a proper connection under such circumstances questionable. Finally, the U.S. Pat. No. 2,267,802 invention requires the use of two cross pins and two components each with corresponding blind holes which increases the production costs and makes the device more susceptible to build up of salt and sand in a maritime environment.

There are also many other connectors in prior art which do not apply to the field of sailing or the specific requirements of a sailboat rigging type connection. The Strunk et al. patents, U.S. Pat. Nos. 2,299,357 and 2,362,856 describe a connection using a slotted fitting primarily designed for limited space in aircraft. The inventions do not present a lockable configuration suitable to resist accidental release from twisting action created from the rubbing of lines and sheets. The Norwood patent, U.S. Pat. No. 7,455,542 and the Zahlit patent, U.S. Pat. No. 7,104,826 relate to a mating connector designed for the use with BNC type cables. These connectors were not designed for electrical cables and not for structural use and do not possess a locking feature. The Perlman patent, U.S. Pat. No. 4,448,476 and the Herbert patent, U.S. Pat. No. 4,981,448 relate to a connector designed for holding electrical fuses and again are not for structural use. The Stillbach patent, U.S. Pat. No. 2,444,758 relates to a coupling for mops and brooms and again utilizes an single exterior locking sleeve prone to snagging in the field of sailing. The Packer patent, U.S. Pat. No. 2,060,523 relates to a coupling for egg beater shafts and utilizes a Z shaped slot arrangement different from the proposed invention and again has no locking feature suitable for use in the field of sailing. The Marizo patent, U.S. Pat. No. 5,582,489 relates to a coupling primarily for automobile steering shafts and is designed more for torsional loads and not tensional forces. It also lacks a suitable locking feature for sailing applications. Finally, the Trice patent, U.S. Pat. No. 8,262,311 relates to a coupling for fuel rods in nuclear reactors and consists of radially positioned teeth for its locking ability instead of the simpler and less expensive design of the presented invention.

The present invention presents a securely lockable quick connection fitting that is designed primarily for use on sailboat stays and rigging. The invention overcomes the shortcomings of the prior art inventions by presenting a design that can be more securely locked and further tightened using a wrench or other force multiplying means so as to be not be as susceptible to accidental release by the rubbing of passing lines and sheets against the connector. In addition, the connection utilizes an internal spring and plunger arrangement to help make the connection somewhat secure even in the unlocked state. This configuration helps to safeguard from accidental release due to any shocks or vibration that may occur during the immediate time of rigging set up and before the operator has had a chance to securely lock the device with the locking nuts. The present invention also possesses a clean exterior profile so as to prevent any snagging of lines during a tack or jibe of the boat. By utilizing only a single blind cavity and a plunger which seals the spring from the exterior elements, the presented invention provides a design which is less prone to the effects of sand and salt build up in blind cavities that prior art inventions lack consideration for. The present invention also provides for a design that is more suitable for production in an automatic swiss-type sliding headstock production lathe by presenting slots and cuts that are oriented in the configurations possible to cut with such machine. In addition, the design minimizes the number of components required by prior art designs to further cut costs. Finally, the configuration allows the invention to be more modular in design than prior art approaches and thus more readily connectable to the existing rigging or fittings on retrofitted sailboats. This modular quality of the present invention allows the user to utilize the existing turnbuckles on a boat to allow for cable tensioning control. The present invention can be used on forestays, shrouds, or any other rigging connection on a boat. In addition, the device can be used in fields outside of sailboats such as construction, architecture, and industrial fields.

SUMMARY OF THE INVENTION

It is an aspect of the present invention to provide a quick connection fitting designed primarily for attaching and detaching sailboat stays and rigging.

Another aspect of the present invention is to provide a quick connection fitting that is designed to hold the same or greater breaking strength as the line or cable it is connecting.

Still another aspect of the present invention provides a quick connection fitting that possesses a lockable means that is not susceptible to being dislodged by the rubbing action of passing lines and sheets.

It is an aspect of the present invention to provide a quick connection fitting that possesses a lockable means that can be further tightened and secured by the means of a force multiplying tool such as a wrench.

Another aspect of the present invention is to provide a quick connection fitting that is somewhat secure even in the unlocked state to safeguard against accidental release before the operator has had a chance to properly lock the device using the main locking mechanism.

Further, it is an aspect of the present invention to provide a quick connection fitting that is designed to have a clean exterior profile that is not prone to snagging on passing lines during the tacking and jibing of a boat.

Another aspect of the present invention is to provide a quick connection fitting that is designed to minimize the effects of salt and sand buildup on the operation of the mechanism.

Further it is an aspect of the present invention to provide a quick connection fitting that is designed in configuration to allow the majority of its production on a swiss-type sliding headstock automatic lathe.

Still another aspect of the present invention provides a quick connection fitting that has a reduced number of required components as compared to prior art connection fittings.

It is an aspect of the present invention to provide a quick connection fitting that is modular in design.

It is a further aspect of the present invention to provide a quick connection fitting that is readily connectable to the existing rigging or fittings on existing sailboats.

Finally, it is an aspect of the present invention to provide a quick connection fitting that can be readily attached to or made modular with an existing turnbuckle so as to allow for the loosening or the tightening of the connected line or cable.

BRIEF DESCRIPTION OF THE DRAWINGS

FIG. 4 is a view of the present invention in the initial process of being connected with the cross pin 2 first slid into slot 14. FIG. 4 also displays a cut away view to better show the position of internal components.

DETAILED DESCRIPTION OF THE PREFERRED EMBODIMENT

Figure 1:
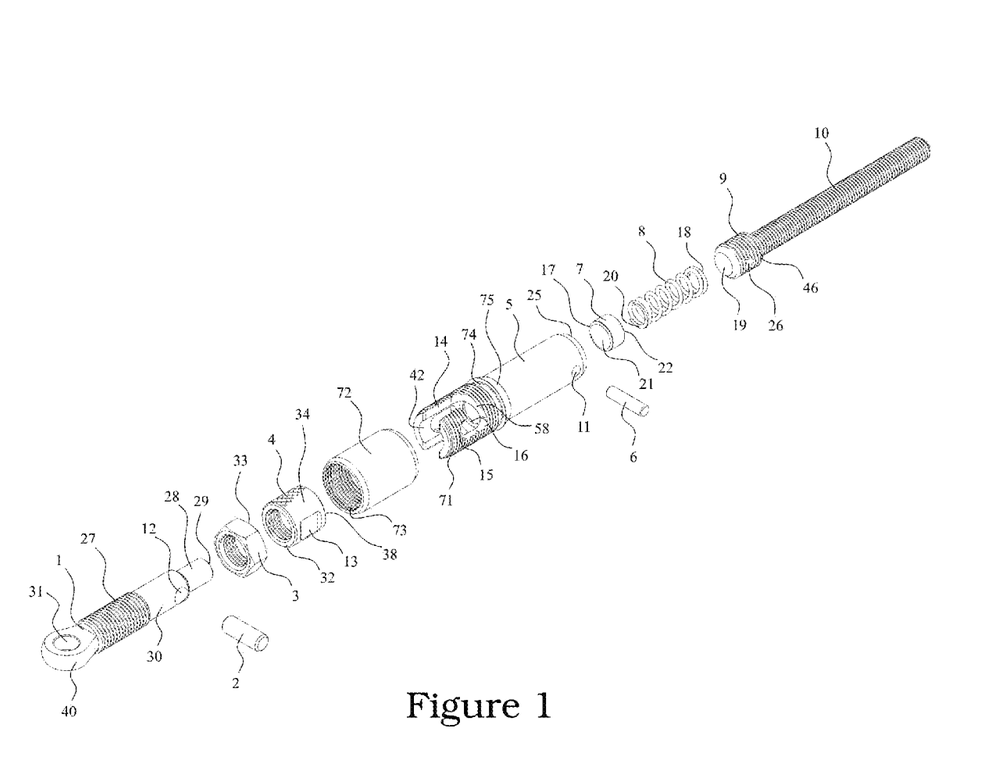
FIG. 1 is an exploded view of the present invention.

FIG. 1 displays an exploded view of the present invention. Main insertion pin 1 is fabricated with a threaded section 27, a section 30 which has a diameter stepped down in size preferably below the minor diameter of the threads of the threaded section 27, and an additional section 28 which has been further stepped down in diameter below that of section 30. Clevis shaped head 40 is created by cold working or machining. Hole 31 is drilled through clevis shaped head 40 and an additional hole 12 is drilled through stepped section 30. Jam nut 3 then screws onto threaded shank 27 and knurled hand nut 4 screws onto shank 27 behind jam nut 3. It should be noted that the use of jam nut 3 is optional and its use is only to provide additional security to prevent knurled hand nut 4 from loosening. It should also be noted that clevis shaped head 40 could also consist of a fork or other suitable configuration. Cross pin 2 is then inserted into hole 12 by a press fit or other means which keeps jam nut 3 and knurled hand nut 4 captive to pin 1. The proper outside dimensions of cold worked or machined clevis head 40 or other suitable configuration keeps jam nut 3 and knurled hand nut 4 captive to pin 1 on the opposite end.

Figure 2:
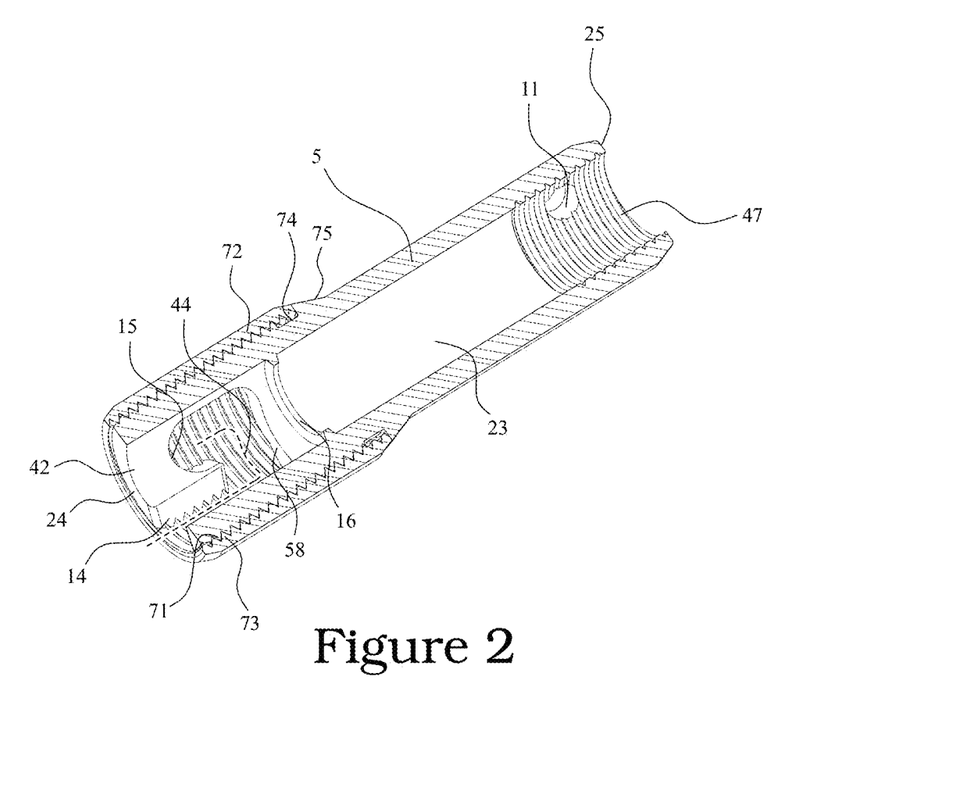
FIG. 2 is a cut away view of barrel 5 to clarify the internal geometry.

The invention also consists of barrel 5 with slots 14, collar 72, plunger 7, spring 8 and rear fitting 9 with threaded sections 10 and 46 and cross hole 26. Barrel 5 has external threads 71 on the end that contains slots 14. External threads 71 terminate with an undercut 74 and a shoulder 75 machined into barrel 5. Collar 72 has internal threads 73 and screws onto external threads 71 of barrel 5 until it seats against shoulder 75. When assembled, collar 72 acts to structurally stiffen the section of barrel 5 in the vicinity of slots 14. Once collar 72 is properly seated it is typically held in place with thread locking compound or a small spot weld to keep it from unscrewing. Threads 46 of rear fitting 9 thread into the back end 25 of barrel 5 until hole 26 is lined up with hole 11. Pin 6 is then inserted through hole 11 and through hole 26. A cut away view shown in FIG. 2 more clearly displays collar 72 fully screwed onto barrel 5 until it seats against shoulder 75. FIG. 2 also displays the internal threads 47 of barrel 5 that threads 46 of rear fitting 9 screw into. It should also be noted that rear fitting 9 can be configured with a plurality of end connections beside the basic threaded section 10 so as to make the fitting modular in design as displayed in FIGS. 8-11.

Referring to FIG. 1 again, the back end 18 of spring 8 pushes against the front surface 19 of rear fitting 9. The front end 20 of spring 8 pushes against the back end 22 of plunger 7. The front edge lip 17 of plunger 7 then rests against internal stepped bore 16 of barrel 5. It should be noted that the cut away view in FIG. 2 more clearly displays the internal stepped bore 16.

FIG. 2 displays a cut away view of barrel 5 to more clearly display its internal geometry. Barrel 5 consists of front end 24 with internal front bore 42. Slots 14 follow paths 44 which resemble a "J" in shape and terminate at end 15. Barrel 5 also consists of internal stepped bore 16, rear end 25, rear bore 23, internal threaded section 47 and cross hole 11. Also more clearly shown is collar 72 fully threaded onto barrel 5 until collar 72 seats against shoulder 74. Internal threads 73 of collar 72 are also shown mating with external threads 71 of barrel 5. Undercut 74 in barrel 5 aids with the manufacturing process to allow collar 72 to thread onto barrel 5 far enough so that collar 72 seats against shoulder 74.

Figure 3:
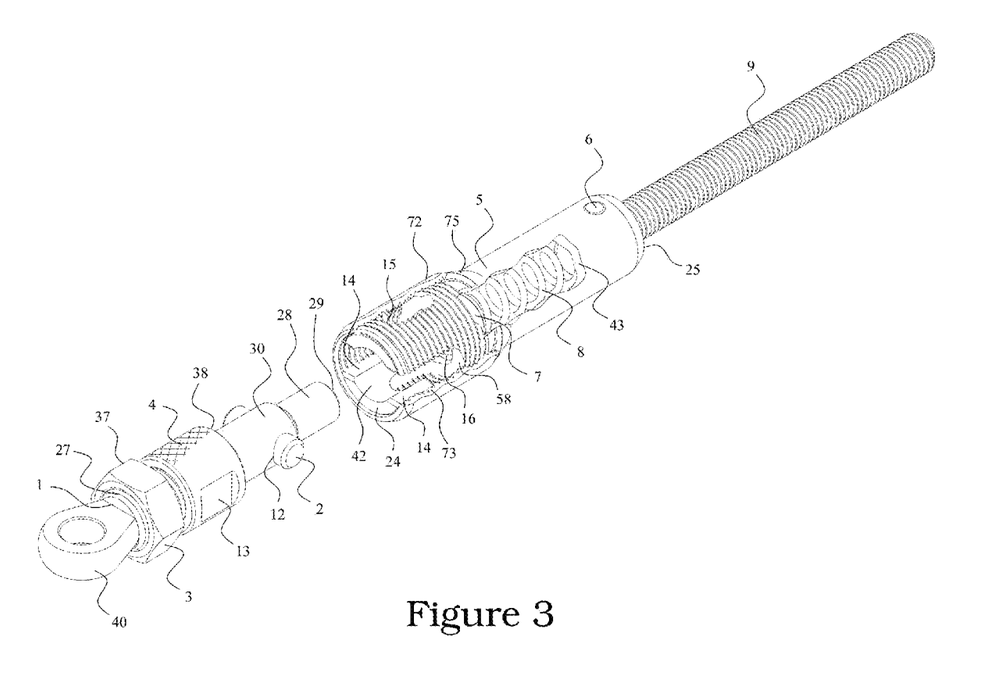
FIG. 3 is a view of the present invention in the detached state and displaying a cut away view to better display internal components.

FIG. 3 displays an assembled view of the present invention with the connection of main pin 1 to barrel 5 still in the detached state but lined up in a configuration ready to become attached. FIG. 3 also displays an additional cut away view on the side barrel 5 and the side of collar 72 to provide further clarity of the interiors. It can be seen that main pin 1 is oriented so that cross pin 2 is lined up in both translational and rotational orientations with slots 14. If main pin 1 is pushed toward barrel 5 cross pin 2 will slide into slots 14. Cross pin 2 is made of proper length so that its ends do not interfere with internal threads 73 of collar 74. Stepped diameter 30 is made to slide into bore 42 of barrel 5 and stepped diameter 28 is made to slide into bore 16 of barrel 5. Spring 8 pushes plunger 7 against the lip created by internal stepped bore 16. The opposite side of spring 8 rests against rear fitting 9. Rear fitting 9 is prevented from unscrewing from barrel 5 by the use of cross pin 6. Knurled hand nut 4 and jam nut 3 are screwed forward toward clevis 40 on threaded portion 27 of main pin 1 so as to allow main pin 1 to slide into barrel 5 without the back edge 38 of knurled hand nut 4 interfering with the front edge 24 of barrel 5 when cross pin 2 is seated all the way to the back edge 58 of slot 14.

Figure 4:
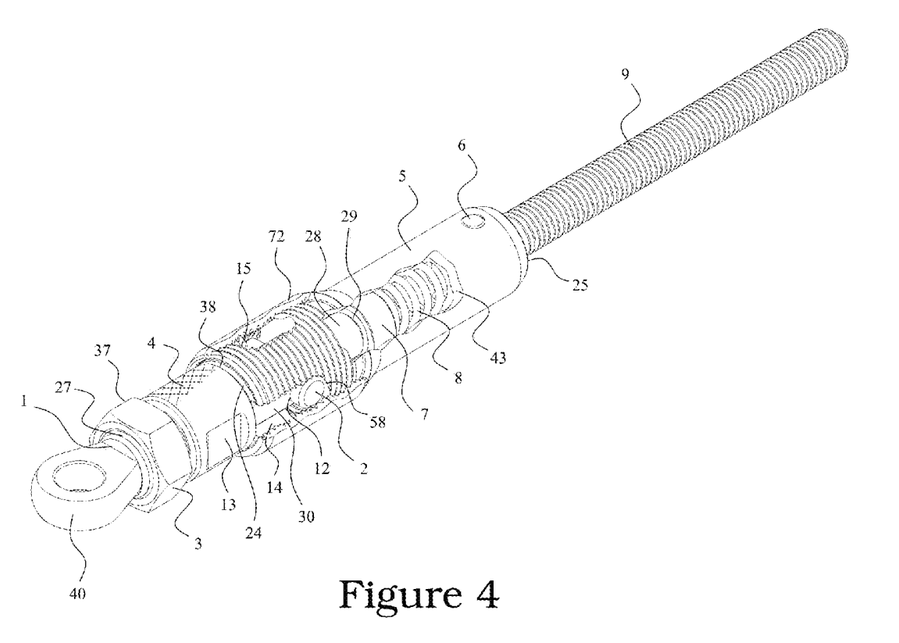

FIG. 4 displays a view of the present invention in the initial process of main pin 1 being connected to barrel 5. A partial cut away view of collar 72 is displayed for clarity. Main pin 1 has been slid into barrel 5 so that cross pin 2 has been slid all the way to the back edge 58 of slot 14. The end 29 of stepped diameter 28 of main pin 1 pushes plunger 7 back and compresses spring 8.

Figure 5:
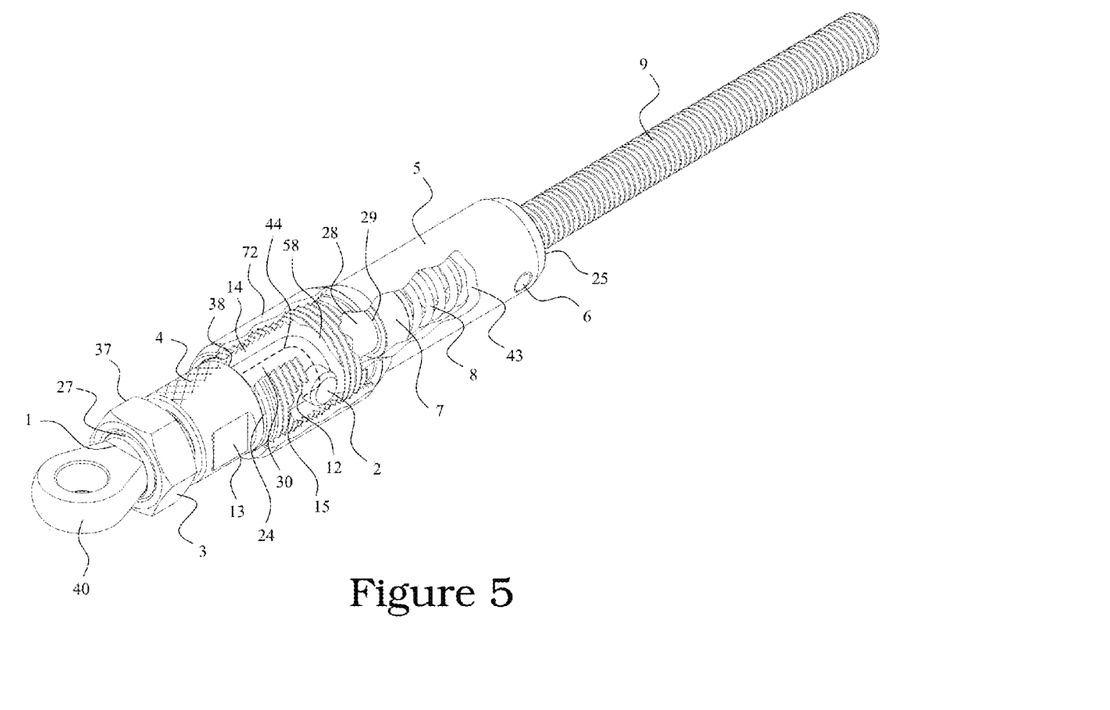
FIG. 5 is a view of the present invention in the next stage of being connected. The cross pin 2 is now rotated to follow the "J" shaped path 44 of slot 14.

FIG. 5 displays a view of the present invention in the next step of main pin 1 being connected to barrel 5. Collar 72 is again displayed in a partial cut away view for better clarity. The barrel 5 is now rotated so that cross pin 2 begins to follow the "J" shaped path 44 of slot 14. FIG. 2 had previously displayed this "J" shaped path 44 for better clarity.

Figure 6:
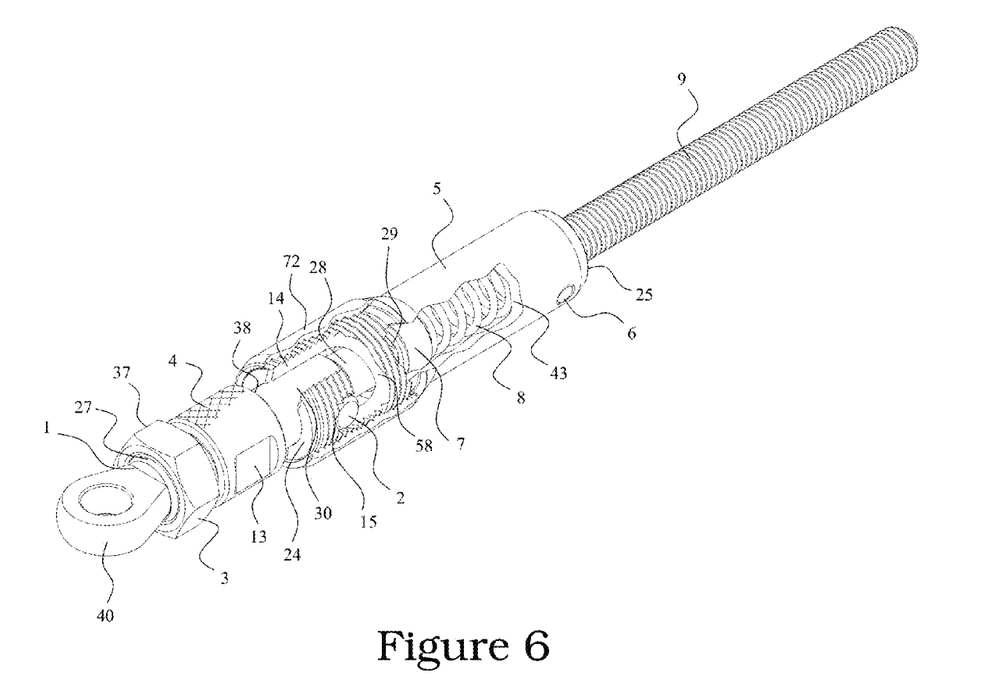
FIG. 6 is a view of the present invention in the connected but unlocked state with pin 2 slid up to the end of slot 14.

FIG. 6 is a view of the present invention in the connected but unlocked state. Again, collar 72 is displayed in a partial cut away view for better clarity. Cross pin 2 has now slid up to the end 15 of slot 14. The compressive force of spring 8 pushes against plunger 7 which in turn pushes against stepped diameter 28 of main pin 1 causing cross pin 2 to become seated against the end 15 of slot 14. The main pin 1 is now connected to the barrel 5 and thus to the rear fitting 9. In this stage there is a gap between the rear face 38 of knurled hand nut 4 and the front face 24 of barrel 5. The present invention is now somewhat secure from disconnecting due to the compressive force of spring 8 pushing cross pin 5 against the end 15 of slot 14.

Figure 7:
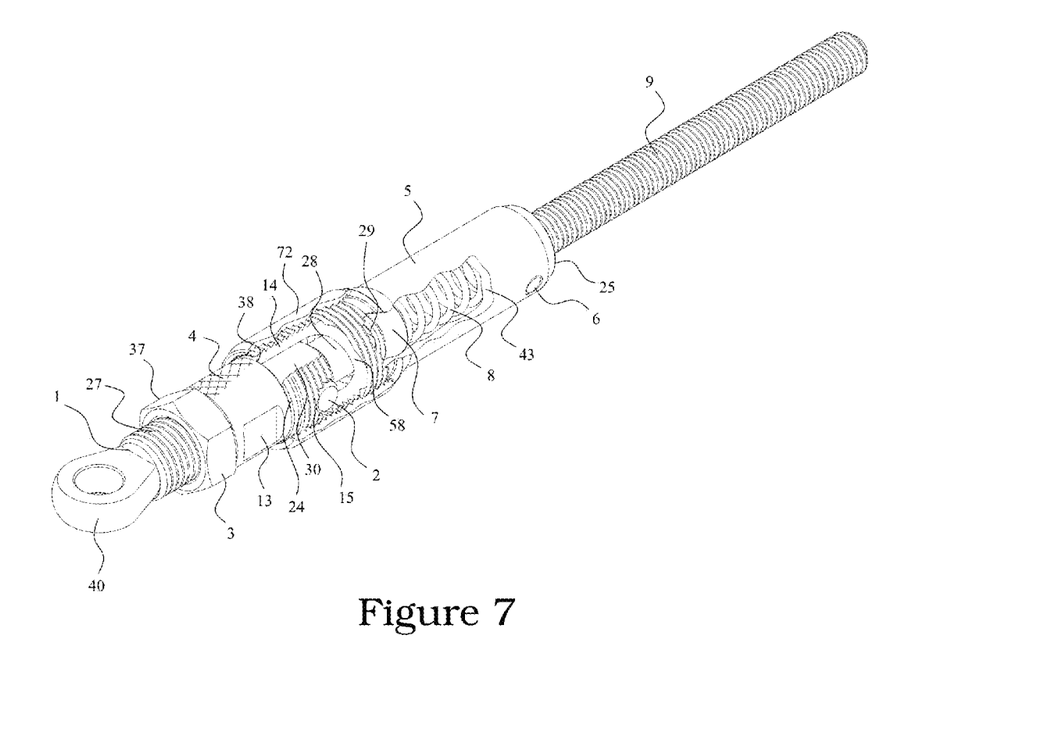
FIG. 7 is a view of the present invention in the connected and locked state with lock nuts tightened and displaying a cut away to better display internal components.

FIG. 7 is a view of the present invention in the connected and locked state with jam nut 3 and knurled hand nut 4 tightened. The rear face 38 of knurled hand nut 4 is now tightened up against the front face 24 of the barrel 5. The jam nut 3 is also tightened up against knurled hand nut 4. The flats 13 on knurled hand nut 4 are used to attach a wrench to further tighten it if so needed. The flats 37 on jam nut 3 are also used as a location to place a wrench to further tighten jam nut 3 up against knurled hand nut 4. It should again be noted that jam nut 3 can be eliminated from the assembly if security is not critical in the particular application. Cross pin 2 seats up against the ends 15 of slots 14 and prevents any motion of main pin 1 relative to barrel 5 when nuts 3 and 4 are tightened. A close slide fit and tight clearance between the stepped section 28 of main pin 1 and the stepped internal bore 16 prevents debris from entering the cavity where plunger 7 resides. The close slide fit and tight clearance between plunger 7 and internal bore 23 further prevents debris such as salt and sand from entering the section of barrel 5 which contains spring 8. It is also possible to remove cross pin 6 from barrel 5 and unscrew end fitting 9 from barrel 5 so as to gain access to spring 8 and plunger 7 to further clean out debris if such need ever arises. Collar 72 also acts to shield debris from entering slots 14 and further acts to provide a smooth and snag free external profile for the present invention.

Figure 8:
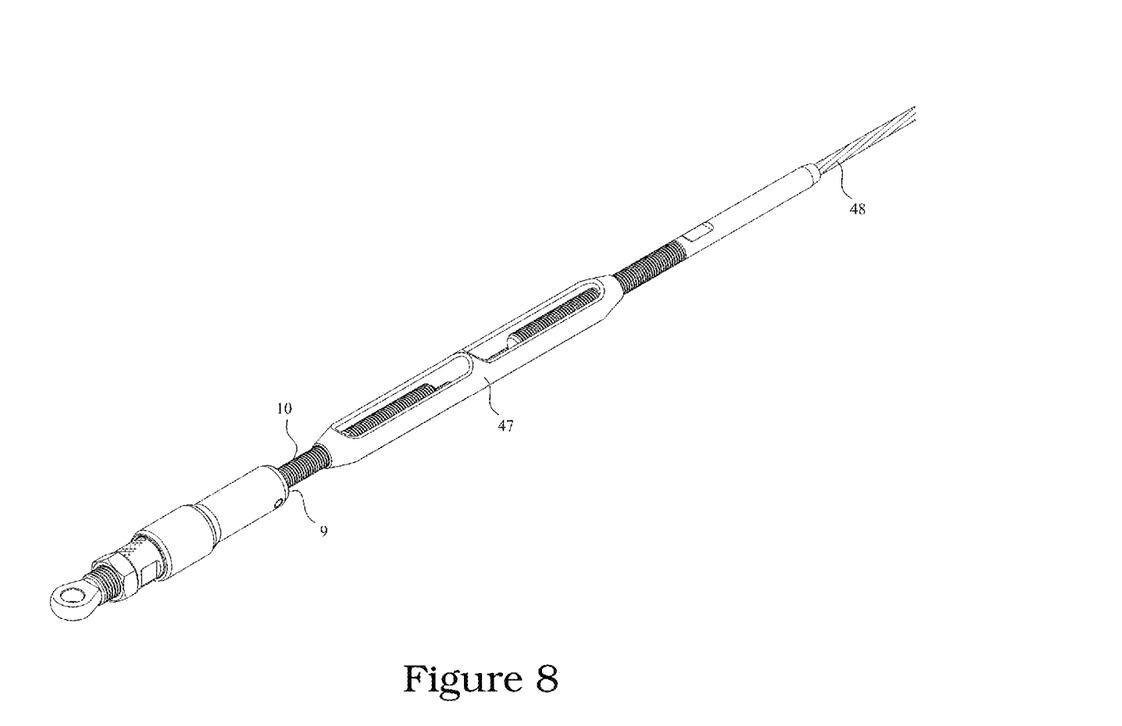
FIG. 8 displays the present invention threaded into a typical turnbuckle.

FIG. 8 displays the present invention threaded into a typical turnbuckle 47. Threaded section 10 of rear fitting 9 is made to screw into the barrel of an existing turnbuckle 47 so as to change the tension of the connected line or cable 48.

Figure 9:
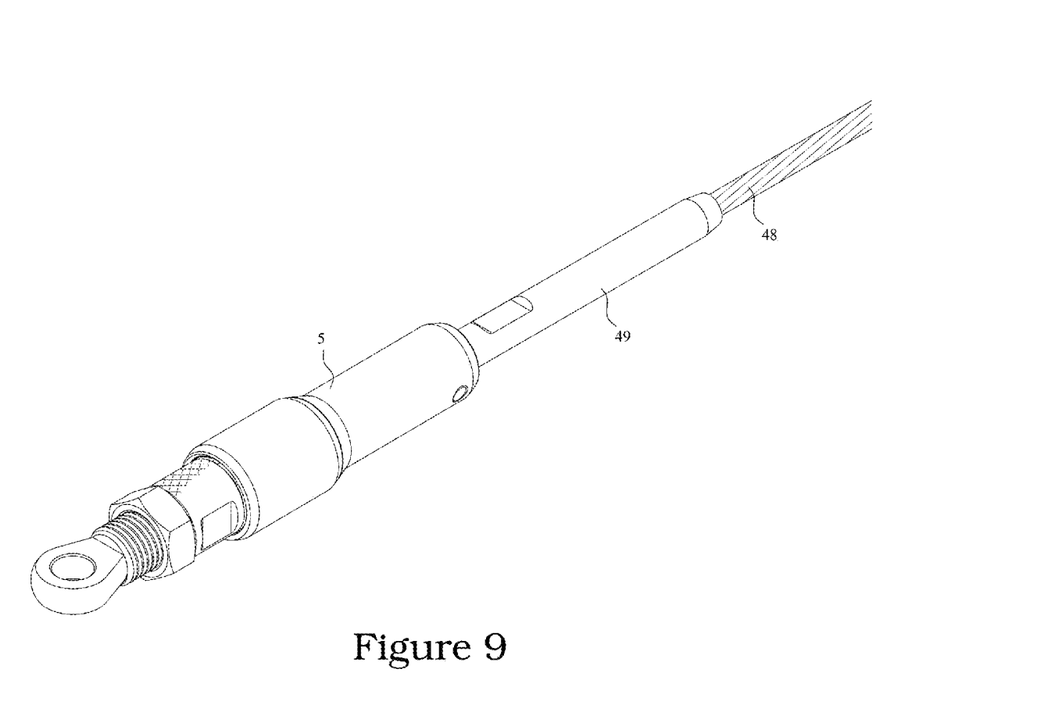
FIG. 9 displays the present invention with an alternate rear fitting which can be swaged onto a cable.

FIG. 9 displays the present invention with an alternate rear fitting 49 attached to barrel 5. Alternate rear fitting 49 can be swaged directly onto a line or cable 48.

Figure 10:
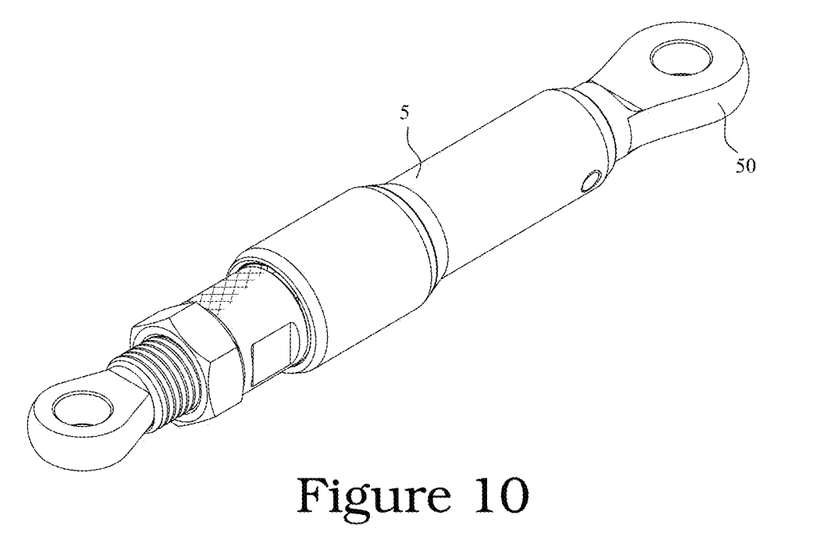
FIG. 10 displays the present invention with another alternate rear fitting displaying a clevis.

FIG. 10 displays the present invention with another alternate rear clevis fitting 50 that can also be attached to barrel 5.

Figure 11:
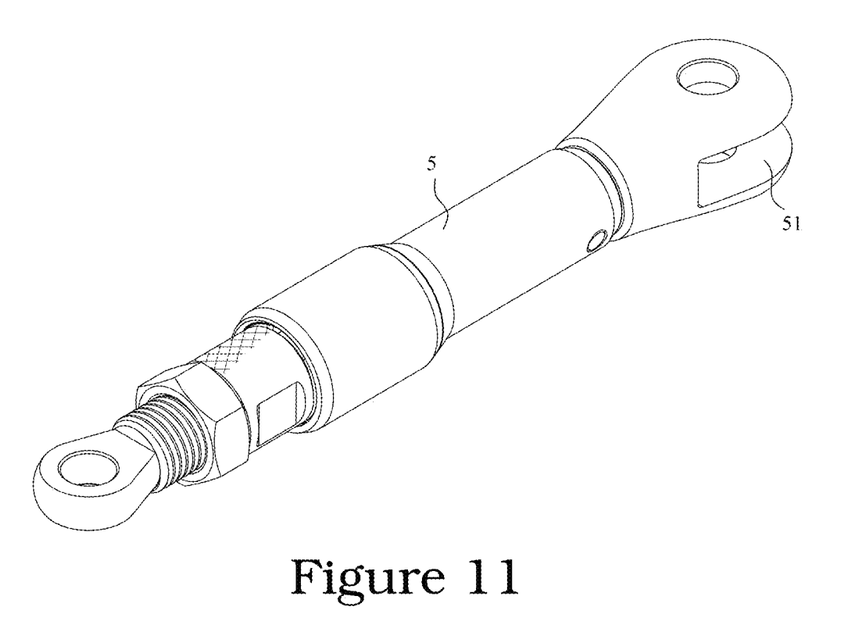
FIG. 11 displays the present invention with yet another alternate rear fitting displaying another form of a clevis.

FIG. 11 displays the present invention with yet another alternate rear clevis fitting 51 that can be attached to barrel 5. Any other alternate rear fitting not presently shown can also be substituted and attached to barrel 5.

Figure 12:
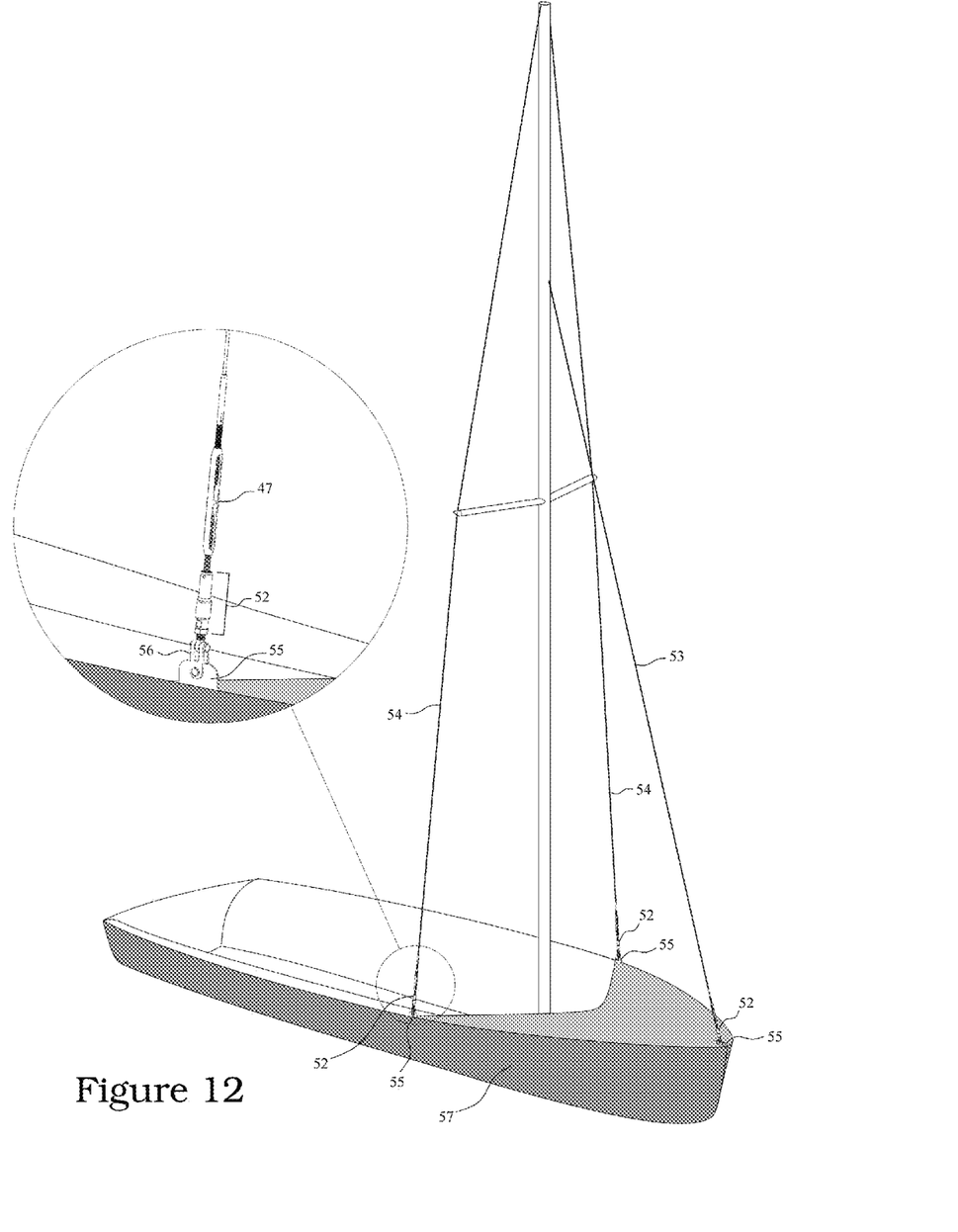
FIG. 12 displays the present invention connected to a typical deck fitting and turnbuckle.

FIG. 12 displays the present invention 52 connected to the typical deck fittings 55 of a boat 57 and utilizing a turnbuckle 47 for the rear fitting. FIG. 12 also displays the present invention 52 connected to the forestay 53 and shrouds 54. The magnified view of FIG. 12 shows the present invention 52 attached to the deck fitting 55 by the use of a toggle fitting 56.

Although the present invention has been described with reference to certain preferred embodiments thereof, other versions are readily apparent to those of ordinary skill in the art of the preferred embodiments contained herein.

What is claimed is:

1. A quick connect fitting for attaching and detaching rigging lines and cables, said quick connect fitting comprising:
   a first connector having a first rigging fastening end and a barrel end; wherein said first connector further comprises:
      a first threaded section adjacent to the first rigging fastening end of said first connector;
      a first unthreaded section contiguous with said first threaded section and having a diameter stepped down in size below the diameter of said first threaded section, and wherein said first unthreaded section having an anchoring hole therethrough;
      a second unthreaded section contiguous with said first unthreaded section, wherein said second unthreaded section having a diameter stepped down in size below the diameter of said first unthreaded section;
      a knurled hand nut that is adapted to screw onto said first threaded section;
      a first cross pin adapted to fit through said anchoring hole to keep said knurled hand nut captive on said first threaded section;
   a second connector having a second rigging fastening end and slot end, wherein said second connector further comprises:
      a barrel cylinder with a bore, a quick connect end and a threaded rod end; wherein a portion of said barrel cylinder adjacent to the quick connect end having external threads on said barrel cylinder; wherein another portion of said barrel adjacent to the threaded rod end having internal threads in the bore of said barrel cylinder; and wherein said barrel cylinder further having a J-shaped slot cut into said barrel cylinder adjacent to the quick connect end of said barrel cylinder, wherein the J-shaped slot is adapted to receive said first cross pin of said first connector; and
   wherein said barrel cylinder has a positioning hole therethrough adjacent to the threaded rod end of said barrel cylinder; and
      a threaded rod having a barrel end and a rigging end, wherein said threaded rod has an insertion section with a rod hole therethrough wherein said insertion section of said threaded rod is adapted to screw into the internal threads in the bore of the portion of said barrel cylinder in the threaded rod end such that the positioning hole in said barrel cylinder lines up with rod hole in said threaded rod; and
      a second cross pin for holding said barrel cylinder to said threaded rod via the respective positioning hole and rod hole when said holes are aligned with said second cross pin placed therein; and
      wherein said first connector is releasably fastened to said second connector by inserting the barrel end of said first connector into the slot of said barrel cylinder to hold said first connector and said second connector together.

2. The quick connect fitting of claim 1 further comprising a locking jam nut threaded onto said first threaded section of said first connector adjacent to the first rigging fastening end of said first connector in order to prevent said knurled hand nut from loosening during use.

3. The quick connect fitting of claim 1 further comprising a strengthening collar having internal threads adapted to screw said collar onto the external threads of said barrel cylinder adjacent to the quick connect end of said barrel cylinder to structurally stiffen the section of said barrel cylinder in the vicinity of the J-shaped slot.

4. The quick connect fitting of claim 1 further comprising;
  a plunger adapted to fit into the bore of said barrel cylinder, said plunger having a second unthreaded section end and a spring end;
  a compression spring also adapted to fit into the bore of said barrel cylinder, said spring positioned between said plunger and the barrel end of said threaded rod;
  such that the force provided by said spring pushing against the second unthreaded section end of said plunger and, in turn, the second unthreaded section of said first connector and said spring also pushing against the barrel end of said threaded rod urges said first cross pin to be held firmly in the bottom of said J-shaped slot in said barrel cylinder.

5. The quick connect fitting of claim 1 wherein said first rigging fastening end of said first connector is a clevis.

6. The quick connect fitting of claim 1 wherein said second rigging fastening end of said second connector is a clevis.

7. The quick connect fitting of claim 1 wherein said second rigging fastening end of said second connector is adapted to be swaged onto a cable.

8. The quick connect fitting of claim 1 wherein said second rigging fastening end of said second connector is adapted to be attached to a turn buckle.

9. The quick connect fitting of claim 1 wherein said knurled hand nut is provided with opposing flats such that said nut can be tightened with a wrench.

\* \* \* \* \*